United States Patent [19]

Schatz et al.

[11] Patent Number: 5,471,644
[45] Date of Patent: *Nov. 28, 1995

[54] METHOD OF REDUCING AUDIO GAP IN DOWNLINK DURING HANDOFF OF CELLULAR RADIOTELEPHONE

[75] Inventors: Steven V. Schatz, McHenry; Thomas W. Richie, Arlington Heights; Barry J. Menich, Schaumburg; Jeffrey D. Bonta, Arlington Heights; Akingbade Akinniyi, Mundelein, all of Ill.

[73] Assignee: Motorola, Inc., Schaumburg, Ill.

[21] Appl. No.: 98,980

[22] Filed: Jul. 29, 1993

[*] Notice: The portion of the term of this patent subsequent to Jan. 31, 2012 has been disclaimed.

Related U.S. Application Data

[63] Continuation-in-part of Ser. No. 81,895, Jun. 25, 1994, Pat. No. 5,386,456.

[51] Int. Cl.⁶ .......................... H04M 11/00; H04Q 7/00
[52] U.S. Cl. ................................. 455/33.2; 379/60
[58] Field of Search ........................ 455/33.2, 33.3, 455/33.4, 56.1; 379/60

[56] References Cited

U.S. PATENT DOCUMENTS

| | | | |
|---|---|---|---|
| 5,101,501 | 3/1992 | Gilhousen et al. | 455/33.2 |
| 5,291,544 | 3/1994 | Hecker | 379/60 |
| 5,386,456 | 1/1995 | Schatz et al. | 379/60 |

Primary Examiner—Reinhard J. Eisenzopf
Assistant Examiner—Andrew Faile
Attorney, Agent, or Firm—Anthony G. Sitko

[57] ABSTRACT

A method of reducing an audio gap in a signal connection with a communication unit during handoff in a cellular communication system is provided. The method includes the steps of providing a temporary signal connection with the communication unit from a mobile switching center (MSC) of a source base site, through the source base site to a handoff target base site and establishing a trunk connection from the MSC of the source base site to a MSC of the target base site. The method further includes the step of interconnecting, at the target base site, the temporary signal connection, trunk connection, and communication unit; and re-routing the signal connection with the communication unit through the trunk connection.

10 Claims, 1 Drawing Sheet

5,471,644

METHOD OF REDUCING AUDIO GAP IN DOWNLINK DURING HANDOFF OF CELLULAR RADIOTELEPHONE

This is a continuation-in-part of application Ser. No. 08/081,895, filed Jun. 25, 1994, now U.S. Pat. No. 5,386,456.

FIELD OF THE INVENTION

The field of the invention relates to communication systems and in particular to cellular communication systems.

BACKGROUND OF THE INVENTION

Cellular communication systems are known. Such systems are typically constructed with a number of partially overlapping service; coverage areas (cells) within which communication services may be provided to cellular radiotelephones (also commonly referred to as a communication units or mobile stations (MSs)) passing through such cells. Communication services within a cell are provided by a base transceiver station (BTS) typically located at a base site.

Cellular communication systems are typically organized with a number of BTSs located at a base site and under the control of a single base site controller (BSC). A BSC and associated BTSs are commonly referred to as a base station system (BSS). A number of BSSs are, in turn, controlled by a mobile switching center (MSC). The MSC in addition to routing calls among BTSs also provides in interconnect with a local public switch telephone network (PSTN) and to other MSCs.

A cellular system, covering a geographic area, allows an MS to communicate among other MSs or with public switch telephone network (PSTN) subscribers through the PSTN interconnect provided at the MSC. Calls received from an MS through a BTS are routed to the BSC which, in turn, routes the call request to the MSC. The MSC then routes the call to the desired party.

The BSC provides message transfer and call switching as directed by the MSC. Control information received from an MS through a BTS of the BSC are routed to the MSC. Calls received by a BSC from the MSC, on a channel of a communication link between the MSC and BSC, are switched under control of the BSC to the appropriate BTS in communication with the MS. Routing of all calls (including those between MSs under the same BSC) are routed through the MSC.

The BSC also typically provides a convenient location for transcoding voice information from a pulse coded format (PCM) used within the PSTN to a compressed version exchanged over the air interface. Speech compression may be accomplished within the transcoder using a linear predictive coding algorithm.

The MSC upon receipt of a call from an MS first determines whether the called party (target) is a MS under its control (within the MSCs geographic area). The MSC may make such a determination by reference to a call history stored within a memory of the MSC. If the target is a MS formerly within the MSC's geographic area, the MSC causes a page message to be generated for the target which is then transferred to each BSC covering the locale the MS was last known to be in. The BSCs then cause the page to be transmitted through each antenna of each BTS connected to the BSC. Upon identification of a location of a target the MSC issues switching commands, directed to requesting and target BSCs, providing a signal path therebetween.

If the MSC determines the target to be a PSTN subscriber, or a subscriber of another MSC (covering a different geographic area), then the MSC composes a call request message to be transmitted into a proper trunk group of the PSTN interconnect or a proper trunk group interfacing MSCs. Trunk groups, in general and channels within trunk groups in specific, are associated with specific geographic areas (and identity of target). An MSC determines the geographic area in which the target is located (and identifies whether the target is a PSTN subscriber or MS) by a translation of the called number. Upon identification of a type of target and geographic area the MSC transmits the call request into the trunk group associated with the target's identity and geographic area.

If the call request is received from the PSTN interconnect or from the MSC interconnect, then the MSC composes a page message for transmission through each BSS within the system. If the MS is within the system the MS responds through the nearest BTS. The response is transferred to the BSC, which in turn transfers the response to the MSC along with an identification of the receiving BTS. The MSC matches the call response with the call request and allocates a signal path from the interconnect to the BSC, along with instructions to the BSC to connect the selected channel of the receiving BTS to the allocated signal path.

Where a communication link has been established between a MS and target, and the MS moves from a first cell into a second cell (target cell), the communication link must be re-established through a BTS of the target cell or the call will be lost. As an aid in identifying the target cell, MSs typically measure signal strengths of signals from surrounding BTSs and transmit signal readings (and identities of a measured BTS) to a serving (source) BTS. The source BTS, in turn, transfers the readings to the MSC for evaluation. Where the target cell is served by the same MSC the MSC simply re-routes the call to the target BTS.

Where the target BTS is served by a second MSC (target MSC), the originating MSC (source MSC) must establish a communication path across a seam in the cellular communication system. The originating MSC does this by requesting access to the target BTS through a trunk group associated with the target MSC. The time required to re-route the call through the trunk group and target MSC results in an interruption of audio information that is perceived by a user as an audio hole or gap. Because of the importance of cellular communication a need exists for a means of re-routing calls between cells served by different MSCs that does not create audio gaps.

SUMMARY OF THE INVENTION

A method of reducing an audio gap in a signal connection with a communication unit during handoff in a cellular communication system is provided. The method includes the steps of providing a temporary signal connection with the communication unit from a mobile switching center (MSC) of a source base site, through the source base site to a handoff target base site and establishing a trunk connection from the MSC of the source base site to a MSC of the target base site. The method further includes the step of interconnecting, at the target base site, the temporary signal connection, trunk connection, and communication unit; and re-routing the signal connection with the communication unit through the trunk connection.

DETAILED DESCRIPTION OF THE PREFERRED EMBODIMENT

The solution to the problem of audio gaps in cellular handoff among MSCs lies, conceptually, in creating a temporary inter base site signal connection (peer-to-peer signal path) between source and handoff target base sites. The temporary signal connection is maintained until a trunk connection is established between the MSC of the source base site (source MSC) and the MSC of the target base site (target MSC).

Figure 1:
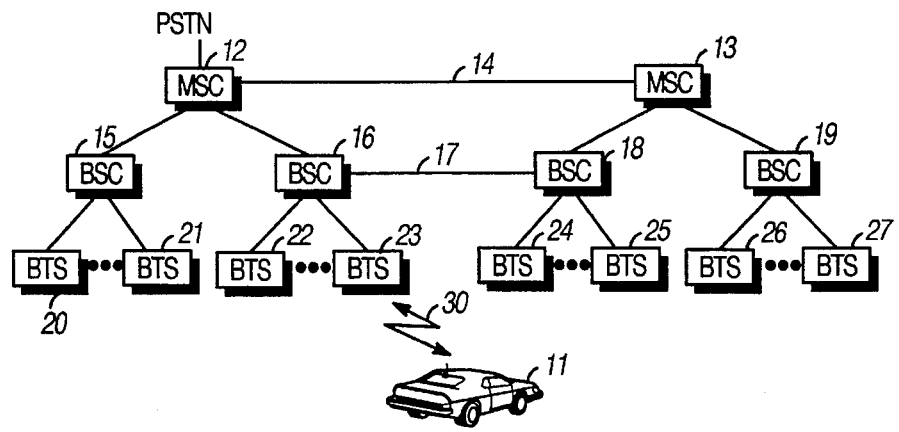
FIG. 1 comprises a block diagram of a cellular communication system in accordance with the invention.

FIG. 1 is a block diagram of a cellular communication system 10 in accordance with an embodiment of the invention. Included within the communication system 10 is a first MSC 12 providing communication services within a first area through a first and second base site (BSCs 15–16 and BTSs 20–23). Also included is a second MSC 13 Providing communication services within a second area through a third and fourth base site (BSCs 18–19 and BTSs 24–27). Handoff of calls between the first area and the second area, in a first instance, is accomplished through MSC trunk group 14. Temporary call connections between the first area and second area, in the second instance, is accomplished through voice circuits 17 interconnecting BSCs 15–16 in the first area with BSCs 18–19 in the second area.

By way of example a communication unit (MS 11) initiates a call to a PSTN subscriber (not shown). In support of the call the MS 11 transmits an access request 30 to BTS 23. The BTS 23 transfers the request to the BSC 16. The BSC 16, in turn, transfers the access request to the MSC 12. In response to the access request, the MSC composes a call request message for transmission into the appropriate trunk group of the PSTN. The MSC 12 also allocates a signal path to the BTS 23 and forwards instructions to the BSC 16 for allocation of a traffic channel at the BTS 23 for use by the MS 11. Upon completion of call set-up the MS 11 begins communicating with the PSTN subscriber.

As the call continues the MS 11 moves into the cell of BTS 24. The MS 11 detects the movement through signal measurements of nearby BTSs (e.g., 22–25). In due course the signal measurements are transferred to a handoff source BTS 23 (source BTS) and in turn to the MSC 12 (source MSC). The source MSC 12 (or the BSC in some systems) based upon a comparison of the signal measurements with threshold values determines that BTS 24 is the best handoff target (target BTS).

Since the MSC 12 cannot predict the precise instant when the MS 11 will change channels, a temporary signal connection 17 is established by the source MSC 12 between a transcoder in the source BTS 16 and the target BTS 24. The use of the temporary connection 17 allows for the simultaneous transmission of signal information to the MS 11 through the handoff target BTS 24 (on a new channel allocated by the target BTS 24) and transmission of signal information on the channel allocated in the source BTS 23.

Since a BTS is capable of handling only a limited number of calls, the temporary connection from the source BTS 23 to the target BTS 24 must be replaced by a trunk connection through MSC trunk group 14. In support of establishing such a connection the source MSC 12 composes a call transfer message for transmission through the proper trunk group of the MSC trunk group 14 to the MSC 13 of the target BTS 24 (target MSC).

The target MSC 13 in response to the message forwards instructions to the BSC 18 of the target BTS 24. The instructions cause the BSC 18 to allocate a traffic channel to the MS 11 through the BTS 24. The instructions also cause the BSC 18 to provide a three-party connection within the BSC 18 with a first and a second connection of the three-party connection dedicated to the traffic channel of the BTS 24 and the temporary signal connection 17 respectively. The third connection of the three-party connection is dedicated to a signal path that the target MSC 13 establishes between the BSC 18 and the source MSC 12 (the MSC trunk connection).

The use of the three-party connection at the target BSC 18 allows for signal information from either signal path (temporary signal connection and MSC trunk connection) to be summed and transmitted to the MS 11 through the target BTS 24. Summing and transmitting signal information provides the beneficial effect of reducing audio gaps when the instant of handoff cannot be determined.

Following transmission of a handoff command by the source MSC 12 through the source BTS 23, set-up of the temporary signal connection between the source BSC 16 and target BSC 18, and channel allocation by the target BTS 24, the system 10 waits for transmission of a handoff complete message by the MS 11 on the channel allocated through the target BTS 24. Following receipt of the handoff complete message and set-up of the MSC trunk connection the three-party connection is bypassed and the temporary connection abandoned.

Figure 2:
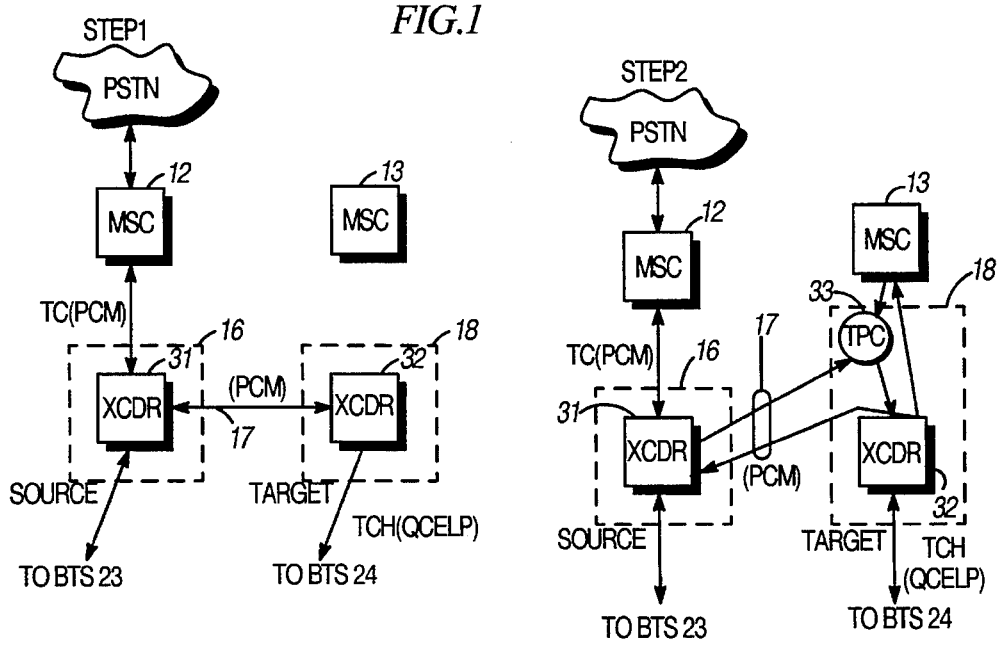
FIG. 2 comprises a block diagram depicting the four stages of handoff in accordance with the invention.

Shown in FIG. 2 are four block diagrams depicting the four steps of handoff in accordance with the invention. In a first step a temporary signal connection 17 has been established in accordance with the invention. An information signal transceived through the source MSC 12 under pulse code modulation (PCM) is transferred from the MSC 12 to a transcoder (XCDR) 31 in the source BTS 16 and to a XCDR 32 in the target BSC 18. Within the XCDRs 31 and 32 the PCM signal is converted into a proper format for transfer over the traffic channel.

In a second step of the handoff the target MSC 13 has established a three-party connection 33 within the target BSC 18. Downlink information of a downlink signal stream (from PSTN subscriber to MS 11) is transferred from the source BSC 16 to the MS 11 through the source BTS 23 and through the three-party connection 33 within the target BSC 18. Since the target MSC trunk connection has not yet been established the target MSC 13 is providing a quiet tone to the third connection of the three-party connection 33, thereby having no effect on the signal transmitted to the MS 11.

In the uplink direction (MS 11 to PSTN subscriber) the XCDR 32 is transcoding whatever traffic channel information is being received on the allocated channel through the target BTS 24. The source BTS 23, likewise, is transcoding traffic channel information. The XCDR 31 within the source BSC 16 selects the PCM signal from the BTS (source BTS 23 or target BTS 24) on which a signal is detected from the MS 11.

In the third step, the MSC trunk connection (from the source MSC 12 to the target BSC 18) has been completed and a handoff complete message has been received from the MS 11. Following receipt of the handoff complete message, a bypass 34 is established around the three-party connection 33. Following bypass of the three-party connection 33, the three-party connection 33 and temporary signal path 17 are abandoned.

In another embodiment of the invention and during the first step of handoff, the temporary signal connection from source BSC 16 to target BSC 18 is established through the source MSC 12 and target MSC 13 on a temporary trunk connection. During the second step a three-party connection is established all the target BSC 18 in the downlink among the target BSC 18, the downlink of the temporary trunk connection, and the downlink of the permanent target MSC trunk connection. As above, downlink information of a downlink signal stream (from PSTN subscriber to MS 11) is transferred from the source BSC 16 to the MS 11 through the source BTS 23, the temporary trunk connection and through the three-party connection 33 within the target BSC 18. Since the permanent target MSC trunk connection has not yet been established the target MSC 13 is providing a quiet tone to the third connection of the three-party connection 33, thereby having no effect on the signal transmitted to the MS 11.

In the third step, the permanent MSC trunk connection (from the source MSC 12 to the target BSC 18) has been completed and a handoff complete message has been received from the MS 11. Following receipt of the handoff complete message, a bypass is established around the three-party connection. Following bypass of the three-party connection 33, the three-party connection and temporary signal path are abandoned.

In another embodiment of the invention the temporary signal connection and three-party connection are used to reduce an audio gap during handoff among BSCs 15, 16 under the same MSC. The temporary connection among BSCs 15, 16 may be accomplished by a peer to peer connection or through a temporary connection through the MSC 12. As above the three-party connection is used to sum audio from the temporary connection until the permanent connection becomes available. As above, when the permanent connection becomes available the temporary connection (and three-party connection) is abandoned.

The many features and advantages of this invention are apparent from the detailed specification and thus it is intended by the appended claims to cover all such features and advantages of the system which fall within the true spirit and scope of the invention (e.g., a duplex temporary signal connection where uplink and downlink signal processing are identical). Further, since numerous modifications and changes will readily occur to those skilled in the art (e.g., the transcoder may be in the MSC), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. A method of reducing an audio gap in a signal connection with a communication unit during handoff in a cellular communication system, the method comprising the steps of:

establishing a temporary inter-base site signal connection between a source base site and a target base site for routing signals from the communication unit through the target base site to the source base site;

establishing a trunk connection between a source mobile switching center associated with the source base site and a target mobile switching center associated with the target base site;

interconnecting, at the target base site, the temporary inter-base site signal connection, the trunk connection and the communication unit; and routing signals from the communication unit to the source mobile switching center through the trunk connection.

2. The method as in claim 1 wherein the step of establishing a temporary inter-base site signal connection comprises establishing a signal path between a transcoder of the source base site and a transcoder of the target base site.

3. The method as in claim 1 wherein the step of interconnecting the temporary inter-base site signal connection, the trunk connection and the communication unit comprises establishing a three party connection by linking the temporary signal connection, a downlink from the trunk connection and a traffic channel assigned to the communication unit by the target base site.

4. The method as in claim 3 further comprising the steps of:

receiving from the communication unit a handoff complete message;

establishing a signal connection from the target mobile switching center and the target base site bypassing the three party connection; and terminating the temporary inter-base site signal connection and the three party connection.

5. A method of reducing an audio gap in a signal connection with a communication unit during handoff in a cellular communication system, the method comprising the steps of:

establishing a temporary inter-base site signal connection between a source base site and a target base site via a temporary trunk connection between a source mobile switching center associated with the source base site and a target mobile switching center associated with the target base site for routing signals from the communication unit through the target base site to the source base site;

establishing a permanent trunk connection between the source mobile switching center and the target mobile switching center;

interconnecting, at the target base site, the temporary trunk connection, the permanent trunk connection and the communication unit; and routing signals from the communication unit to the source mobile switching center through the permanent trunk connection.

6. The method as in claim 5 wherein the step of interconnecting the temporary trunk connection, the permanent trunk connection and the communication unit comprises establishing a three party connection by linking a downlink from the temporary trunk connection, a downlink from the permanent trunk connection and a traffic channel assigned to the communication unit by the target base site.

7. The method as in claim 6 further comprising the steps of:

receiving from the communication unit a handoff complete message;

establishing a signal connection from the target mobile switching center and the target base site bypassing the three party connection; and terminating the temporary inter-base site signal connection and the three party connection.

8. A method of reducing an audio gap in a signal connection with a communication unit during handoff in a cellular communication system, the method comprising the steps of:

establishing a temporary inter-base site signal connection between a source base site and a target base site for routing signals from the communication unit through the target base site to the source base site;

establishing a permanent signal connection between a mobile switching center and the target base site;

interconnecting, at the target base site, the temporary inter-base site signal connection, the permanent signal connection and the communication unit; and routing signals from the communication unit to the mobile switching center through the permanent connection.

9. The method as in claim 8 wherein the step of interconnecting the temporary inter-base site signal connection, the permanent signal connection and the communication unit comprises establishing a three party connection by linking the temporary inter-base site signal connection, the permanent signal connection and a traffic channel assigned to the communication unit by the target base site.

10. The method as in claim 9 further comprising the steps of:

receiving from the communication unit a handoff complete message; and terminating the temporary inter-base site signal connection and the three party connection.

* * * * *